UNITED STATES PATENT OFFICE.

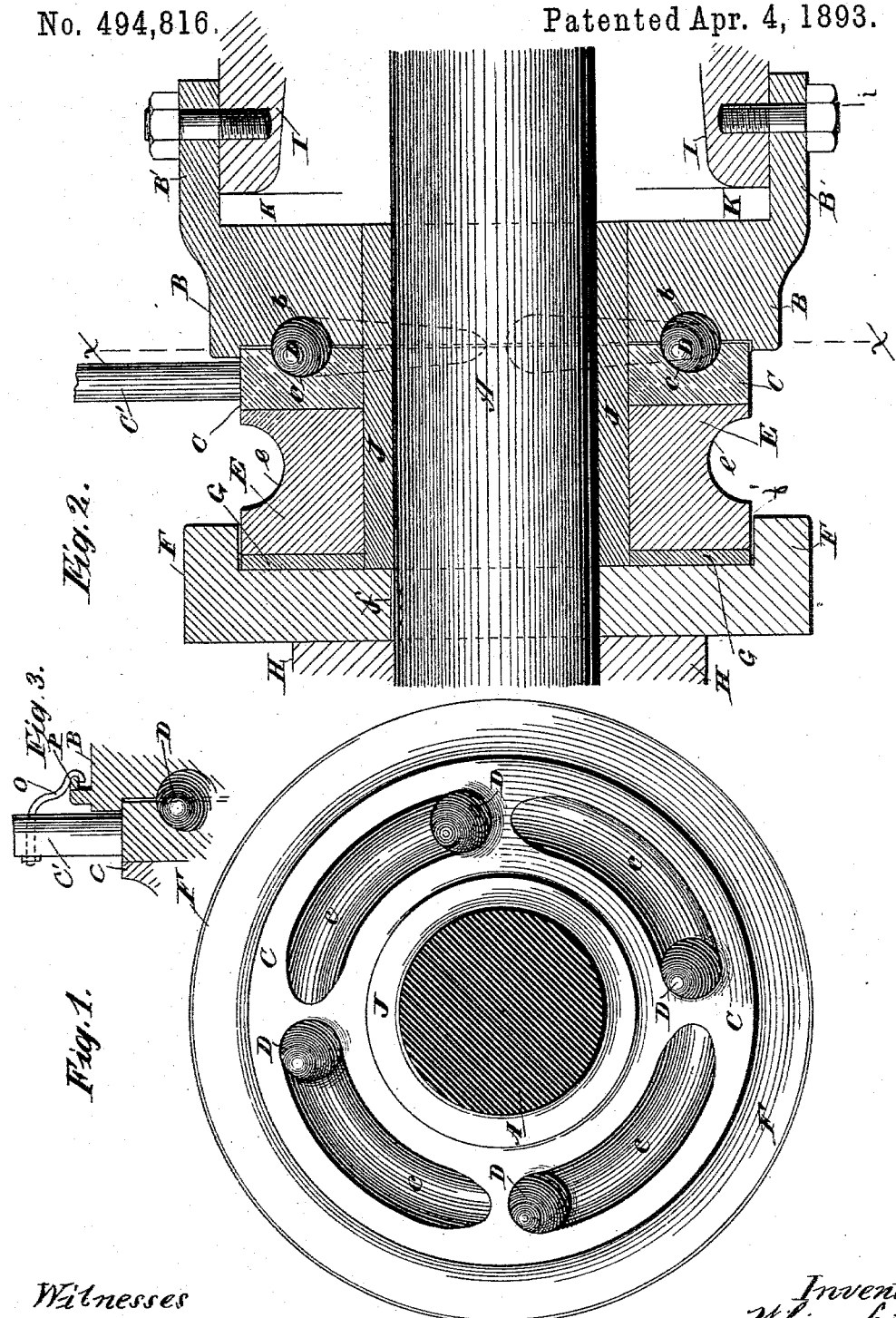

WILIAM LEATCH, OF CLEVELAND, OHIO.

RAILWAY-CAR BRAKE.

SPECIFICATION forming part of Letters Patent No. 494,816, dated April 4, 1893.

Application filed August 22, 1892. Serial No. 443,751. (No model.)

*To all whom it may concern:*

Be it known that I, WILIAM LEATCH, a citizen of the United States, and a resident of Cleveland, county of Cuyahoga, State of Ohio, have invented certain new and useful Improvements in Railway-Brakes, of which I hereby declare the following to be a full, clear, and exact description, such as will enable others skilled in the art to which it appertains to make and use the same.

My invention relates to improvements in railway car brakes, and is especially designed for use on electric street railways, where the space is small for the location of a brake, but it is also designed for use in hoisting engines and a large class of devices.

The object of the invention is to provide a brake capable of quick and efficient action while also capable of variable power as desired.

My invention consists in the combination and arrangement of parts and construction of details as hereinafter described, shown in the accompanying drawings and more specifically pointed out in the claims.

In the accompanying drawings Figure 1 is a face view of one of the friction disks; a section being taken through shaft on line $x$—$x$, Fig. 2. Fig. 2 is a vertical section on center line of shaft or axle, taken on axial line. Fig. 3 is a detail.

A in the drawings is the axle of a street car wheel.

H is a portion of the hub of the wheel, and I is the flange of the frame supporting the motor.

In the narrow space between the hub H and flange I must be placed the brake mechanism, which is constructed as follows: B and C are disks sleeved over the axle A the disk B being rigidly secured to the frame I as by bolts $i$ passing through lugs B', while the disk C is free to turn on the axle. Between these disks are placed the hardened balls D, which are secured in cam shaped or inclined grooves $b$ and $c$, the balls normally resting in the deepest part of their grooves as seen in Fig. 1, the rate of inclination for which is seen clearly in dotted lines in Fig. 2. An actuating lever C' is secured to the disk C. E is a spool loosely sleeved upon the shaft and provided with the concentric groove $e$ over which the brake chain passes. F is a disk keyed at $f$ upon the axle and slightly overlapping it at $f'$. G is a friction disk preferably of fiber situated between the engaging surfaces of the disks F and E. J is a sleeve of brass or other metal suitable for the purpose placed between the aforesaid disks B, C, and E and the axle, upon which it is sleeved, for the purpose of preventing the wear upon the axle incident to the strain of the revolving disks.

In operation it will be seen that when the lever C' is turned the disk C will be rotated upon the disk B, thus carrying the hardened balls D up the inclines $c$ and $b$, separating the disks, and crowding the disk against the spool E, which in turn is jammed against the fiber G and disk F, in this manner effectively braking the axle A. The lever C' is held stiffly at any angle desired while the chain over the spool E tends to revolve the adjacent disk C still further and as the balls roll force the disks farther apart; which contain the balls between them. When perfect frictional contact is made between the spool E and adjacent disk C, of course the balls will be revolved to the highest portion of the inclines and the braking will be perfect.

Varying degrees of power may be obtained by not making the contact between the disk C and spool E absolute at first. To accomplish this the rod connecting the lever C' with the brake lever at front of car must be stiff enough to sustain considerable pressure. This portion of the device together with the brake chain passing over the pulley E are old and well known mechanism and are not specifically included in the invention. . As an assistance in securing the permanent contact of the balls and adjacent disks a spring as O may be employed which is secured to one of the disks or to the lever C', and hooked over a flange or projection on the other disks, as P. If desired more than one spring can be employed for this purpose.

Having described my invention, what I claim as new, and desire to secure by Letters Patent, is—

1. In a brake for gradual frictional pressure; the combination of the disks B and C provided with segmental grooved inclines $b$ and $c$ on their meeting edges, and hardened balls D, between said disks in said grooved inclines, in combination with, an actuating lever on one of the disks, a pulley wheel E adjacent to one of the disks, friction disk F secured to the shaft or axle A, passing through all the disks, and rigid support I for disk B, all substantially as and for the purpose set forth.

2. In an axle brake, the combination of adjacent disks on the axle the one being stationary but loose on the axle, and the other being loose upon the axle and free to turn thereon, the said disks being provided with segmental inclines on their meeting faces grooved therein, of steel or hardened balls within said grooves and mechanism for revolving said disks upon one another, and for receiving the thrust of the separated disks substantially as described.

3. In an axle brake, the combination of brake mechanism located between the wheel hub and motor frame consisting in the disk B secured to the motor frame, and loosely sleeved over the axle, the disk C adjacent thereto loose upon the axle, balls D located in segmental inclined grooves between the said disks, means for rotating the disk C upon the axle the adjacent pulley disk E loose upon the axle, and the disk F keyed upon the axle, and slightly overlapping the disk E, with the intervening friction disk G, substantially as described.

4. The combination of braking disks, and pulley substantially as described with the sleeve J and axle A substantially as described.

5. The combination of the motor frame I and disk F keyed to the axle A with the brake mechanism located between them consisting in the braking disks B and C, provided with inclined grooves $b$ and $c$ on their adjacent surfaces, balls D located in said grooves, lever C', loose pulley E friction disk G and sleeve J substantially as described.

WILIAM LEATCH.

Witnesses:
 WM. M. MONROE,
 F. H. MOORE.